US009619954B2

(12) United States Patent
Allibhoy et al.

(10) Patent No.: US 9,619,954 B2
(45) Date of Patent: Apr. 11, 2017

(54) SYSTEMS AND METHODS FOR ENTRY CONTROL

(71) Applicant: Project Cloudkey, Inc., Woodland Hills, CA (US)

(72) Inventors: Nizar Allibhoy, Northridge, CA (US); Joel Fabrice Chlodnik, Arequipa (PE); Kristofer David Shinn, Los Angeles, CA (US); Sabir Sadruddin Jaffer, Rancho Palos Verdes, CA (US); Mark Richard Anderson, Los Angeles, CA (US); Justin Leung, Rancho Palos Verdes, CA (US)

(73) Assignee: Project Cloudkey, Inc., Los Angeles, CA (US)

( * ) Notice: Subject to any disclaimer, the term of this patent is extended or adjusted under 35 U.S.C. 154(b) by 0 days.

(21) Appl. No.: 15/016,636

(22) Filed: Feb. 5, 2016

(65) Prior Publication Data

US 2016/0232728 A1 Aug. 11, 2016

Related U.S. Application Data

(60) Provisional application No. 62/112,534, filed on Feb. 5, 2015.

(51) Int. Cl.
*G05B 19/00* (2006.01)
*G07C 9/00* (2006.01)

(52) U.S. Cl.
CPC ..... *G07C 9/00309* (2013.01); *G07C 9/00904* (2013.01); *G07C 2009/00793* (2013.01)

(58) Field of Classification Search
None
See application file for complete search history.

(56) References Cited

U.S. PATENT DOCUMENTS

2008/0252415 A1 10/2008 Larson et al.
2012/0280783 A1* 11/2012 Gerhardt ............ G07C 9/00309 340/5.6
2013/0298616 A1 11/2013 Ullrich et al.
2014/0002236 A1* 1/2014 Pineau .................... G06F 21/32 340/5.6

(Continued)

FOREIGN PATENT DOCUMENTS

WO 2007140777 A1 12/2007
WO 2011160628 A1 12/2011

OTHER PUBLICATIONS

PCT/US2016/016760 International Search Report and Written Opinion, mailed Apr. 15, 2016.

*Primary Examiner* — Adolf Dsouza
(74) *Attorney, Agent, or Firm* — Royse Law Firm, PC

(57) ABSTRACT

Systems of the present invention allow individuals to make and change reservations, check into accommodations, and gain access to their accommodations using their own mobile devices as well as mobile devices provided with the rooms. Room access can be through an entry control system comprising two modules that are mounted to a door and to a proximate wall, or similar fixed surface. One module communicates with an electronically controlled locking mechanism of the door lock, the other module wirelessly receives a room code from the user's mobile device. When the room code is correct, the second module communicates a signal to the first module which unlocks the lock.

27 Claims, 6 Drawing Sheets

(56) References Cited

U.S. PATENT DOCUMENTS

| | | | | |
|---|---|---|---|---|
| 2014/0318199 | A1* | 10/2014 | Gokcebay | E05C 3/042 70/278.1 |
| 2015/0027178 | A1 | 1/2015 | Scalisi | |
| 2015/0228133 | A1* | 8/2015 | Capaldi-Tallon | G07C 9/00039 340/5.54 |
| 2015/0269799 | A1 | 9/2015 | Martinez et al. | |

* cited by examiner

SYSTEMS AND METHODS FOR ENTRY CONTROL

CROSS-REFERENCE TO RELATED APPLICATIONS

This application claims priority to U.S. provisional patent application No. 62/112,534 filed on Feb. 5, 2015 and entitled "Locking System" which is incorporated herein by reference in its entirety.

BACKGROUND

Field of the Invention

The invention is in the field of security and more particularly in the field of electronic entry systems.

Related Art

Room security in hotels and other environments where people take possession of a space for short durations is problematic because of the need for keys. Mechanical locks with traditional mechanical keys were for many years the only solution, and the same keys were passed from guest to guest, in the case of hotel rooms. Such keys, however, are readily duplicated, while the locks are cumbersome to rekey. In recent years the standard has shifted to electronically controlled locks, the most common being the type that includes a magnetic card reader, sometime called a Magstripe lock mechanism. Each time the space is given to a new guest, the code necessary to enter the space is changed and a new key card is issued with the code magnetically encoded on the magnetic stripe. Other examples of electronically controlled locks include an RFID reader and can be opened when an RFID chip with the proper code is within range.

In order to unlock a door without inserting the mag-stripe card into the reader of the lock, it is necessary to have access to its internal components of the electronic lock within the lock protective housing and connect to a proprietary connector embedded therein. This process requires opening the lock housing and making a connection to the custom connector embedded into the lock. Many different types of embedded connectors are known to exist.

SUMMARY

The present invention is directed to entry control systems configured for opening electronic locks, controlled entryways comprising such entry control systems in combination with entryways having doors, as well as methods of operating electronic door locks.

An exemplary entry control system comprises both a lock controller module and a marquee system in communication with one another. The lock controller module includes a circuit configured to connect to the electronic lock, a first wireless communication port, and control logic in communication with both the circuit and the wireless communication port and configured to open the electronic lock in response to a signal received from the first wireless communication port. In some embodiments, the circuit configured to connect to the electronic lock includes a wired interface configured to mate with an interface disposed within the electronic lock.

The marquee system includes a display, a second wireless communication port, a Wi-Fi transceiver, a processor, and a memory, such as Flash, and one or more of a near field communication transceiver, a Bluetooth LE transceiver, an optical camera, a proximity sensor, a light pipe, and an audio system comprising a speaker and/or a microphone. The processor is in communication with each of the other components of the marquee system and is configured to receive a first code from the Wi-Fi transceiver and store the first code in the memory, receive a second code from the near field communication transceiver, or from the Bluetooth LE transceiver, or from the optical camera, and further configured to match the first and second codes and then send the signal over the second wireless communication port to the first communication port, and optionally provide a welcome screen to the display. In some embodiments, the first and second wireless communication ports both comprise infrared transceivers, or both comprise Bluetooth or Bluetooth LE transceivers.

In various embodiments, the marquee system includes a first module having a first housing, the display, the second wireless communication port, the Wi-Fi transceiver, the memory, and the processor, and the marquee system further includes a second module having a second housing and having a near field communication transceiver. In some of these embodiments the first housing also includes an expansion port and the second module is connected to the expansion port of the first module. In some embodiments the electronic lock includes a housing and the lock controller module is disposed within the housing of the electronic lock.

In various embodiments in which the marquee system further includes a camera, the processor can be further configured to receive a video stream from the camera, decode a third code from a QR code presented within the video stream, and match the first and third codes and then provide the welcome screen to the display and send the signal over the second wireless communication port to the first communication port. In some embodiments the marquee system is configured to provide firmware updates to the control logic of the lock controller module.

An exemplary controlled entryway comprises a door frame and a door disposed within a door frame and including an electronic lock. The door can be hingedly attached to the door frame, or optionally can open by rolling up, as in an overhead door, or by sliding, as on a track and into a recess within the wall. The exemplary controlled entryway further comprises a lock controller module connected to the electronic lock and including a first wireless communication port, and control logic in communication with both the electronic lock and the wireless communication port and configured to open the electronic lock in response to a signal received from the first wireless communication port. The exemplary controlled entryway further comprises a marquee system as described above. In some embodiments the electronic lock comprises a magnetic stripe card lock, an RFID lock, or an NFC lock. In some embodiments the lock controller module is mounted on an inside surface of the door and the marquee system is mounted on an outside surface of the door. The lock controller module optionally further includes a circuit configured to provide the communication between the control logic and the electronic lock.

In various embodiments of the exemplary controlled entryway, the first and second wireless communication ports are in optical communication when the door is closed. In some of these embodiments, the first wireless communication port is disposed within the door and the second wireless communication port is disposed within the door frame. Alternatively, the first and second wireless communication ports can be in Bluetooth or Bluetooth LE communication.

An exemplary method of operating an electronic door lock can be performed by an entry control system as described above and comprises the steps of receiving a door code with a Wi-Fi transceiver of a marquee system mounted proximate to the electronic door lock, the marquee system also including a second transceiver, a processor, and a housing containing the transceivers and processor, and after receiving the door code with the Wi-Fi transceiver, wirelessly receiving the door code with the marquee system. The method further comprises, when the codes match, the step of wirelessly sending a first signal, such as an infrared signal, from the marquee system to a lock controller module connected to the electronic lock, the lock controller module including control logic configured to open the electronic lock in response to the first signal received from the marquee system, the lock controller module being mounted proximate to both the electronic door lock and the marquee system. The method then further comprise the steps of receiving the first signal at the lock controller module and sending a second signal from the control logic of the lock control module to the electronic door lock in order to open the electronic door lock. In some of these embodiments the marque system further includes a display and the method further comprises changing the display in response to wirelessly receiving the door code with the second transceiver.

Still further embodiments of the method comprise the steps of generating the room code with a server and then sending the door code from the server to the Wi-Fi transceiver of the marquee system. In other embodiments, the method further comprises the control logic of the lock controller module logging a first event consisting of the opening of the electronic door lock, and then communicating the first event to the marquee system. In some of these embodiments the method additionally comprises the control logic logging a second event consisting of the opening of the electronic door lock with a magnetic key card and communicating the second event to the marquee system. In still further embodiments the method further comprises the marquee system communicating such events to the server.

DETAILED DESCRIPTION OF THE INVENTION

Systems of the present invention allow individuals to make and change their reservations, check in and out of their accommodations, and gain access to their rooms using their own mobile devices as well as mobile devices, including wearable devices, provided with the rooms. Room access can be through an entry control system comprising two modules that are mounted to a door and to a proximate wall, or similar fixed surface. One module communicates with an electronically controlled locking mechanism of the door lock. A guest's mobile device, or a device provided by the hotel, can communicate a digital key, or room code, with the other module of the entry control system, which communicates a signal to the first module in order to release the latch of the door's lock.

Figure 1:
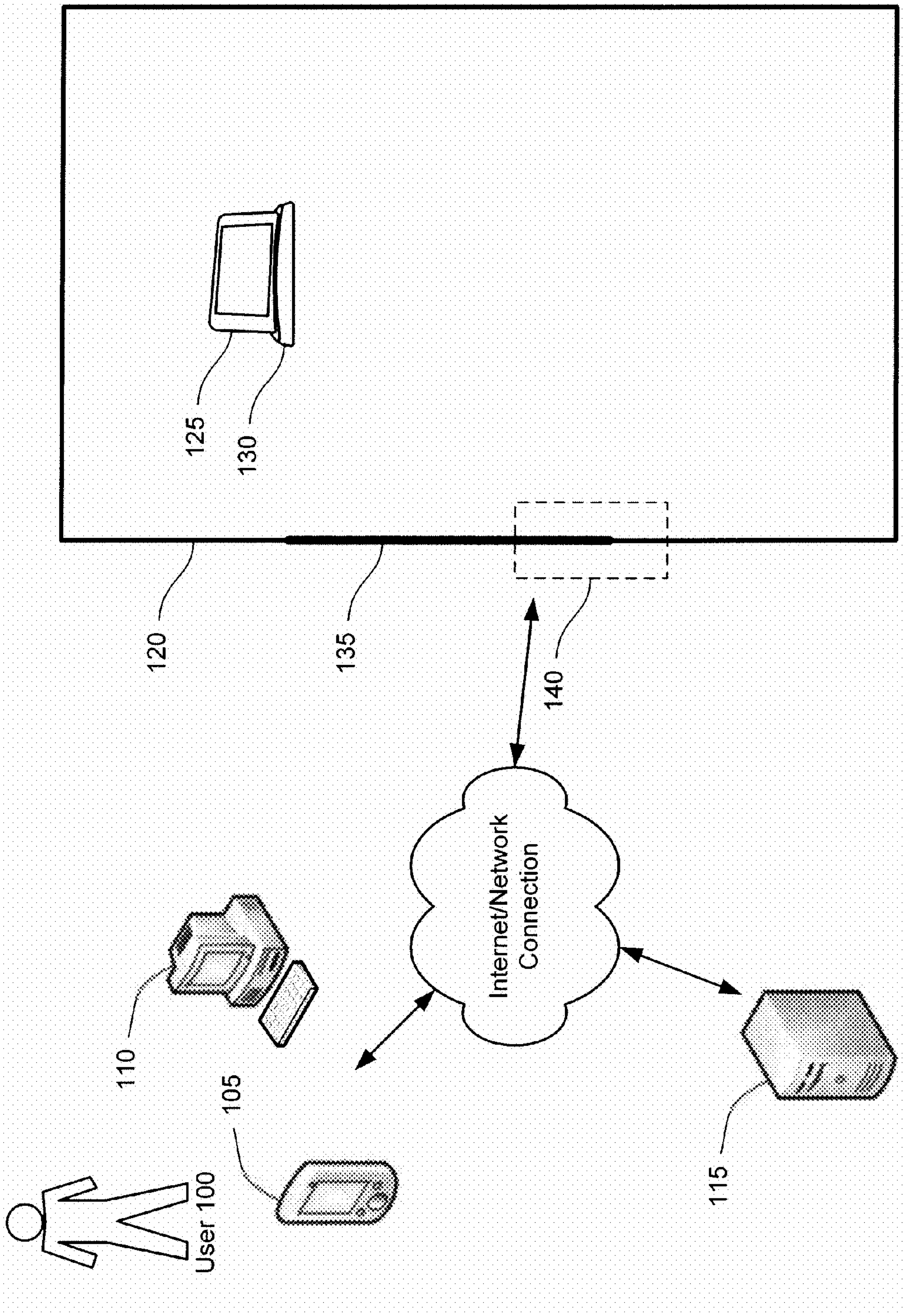
FIG. 1 is an illustration showing a user interacting with systems of the present invention.

FIG. 1 is a schematic illustration meant to show how a user 100 interacts with systems of the present invention. The user 100 has one or more of a hand-held device 105, such as a smartphone or tablet, and a personal computer (PC) 110 where the device 105 and/or computer 110 are used to access a management system made available by a server 115. The device 105 is characterized by a display and a user input which are commonly integrated as a touchscreen display, and further characterized by wireless connectivity through a cellular network, or a Wi-Fi connection to the Internet, or both. Devices 105 optionally also include the ability to wirelessly connected to other nearby devices using, for example, Bluetooth LE protocol and/or a near field communication (NFC) protocol.

The server 115 can make certain aspects of the management system available over the Internet to both the device 105 and computer 110 by serving pages to a browser operating on the device 105 or computer 110. Both the device 105 and computer 110 can also store and execute an application that automatically connects to the server 115 to provide the same functionalities. Other aspects of the management system do not face the public and are only available through dedicated terminals and through devices 105 and computers 110 to authorized individuals possessing appropriate credentials. The server 115 can also generate and encrypt room codes and provide the codes to the mobile device 105 and an entry control system for a reserved room, as described below. In some embodiments multiple room codes can be associated with a given entry control system, for example, with one to support staff entry and one for the use of guests. Room codes can be revoked based on a preset expiration date, a reservation check-out, or through the management system.

FIG. 1 also shows an exemplary controlled space, illustrated here as a hotel room 120, including therein a tablet 125, a docking cradle 130 for retaining the tablet 125, a door 135, and an entry control system 140. The user 100 can obtain a code through the management system prior to reaching the room 120, where the code is used to unlock the door 135. Thus, the user 100 can employ a browser or application on a personal device 105 to make a reservation, customize services connected to the reservation (e.g., extra towels), check into the reservation, obtain the necessary code to unlock the reserved room 120, and then to employ that device 105 to unlock the door 135. It will be appreciated that although the example here is provided as a hotel room 120, the same system could be used to reserve and then access a private residence equipped with the entry control system 140; additionally, interior doors 120 of such a residence when equipped with instances of the entry control system 140 can likewise be individually controlled. The tablet 125 can also be used to access the management system; the management system can also be accessed by authorized personnel, such as hotel employees, to process requests. See FIG. 8, below, for further discussion of the management system.

Figures 2, 3:
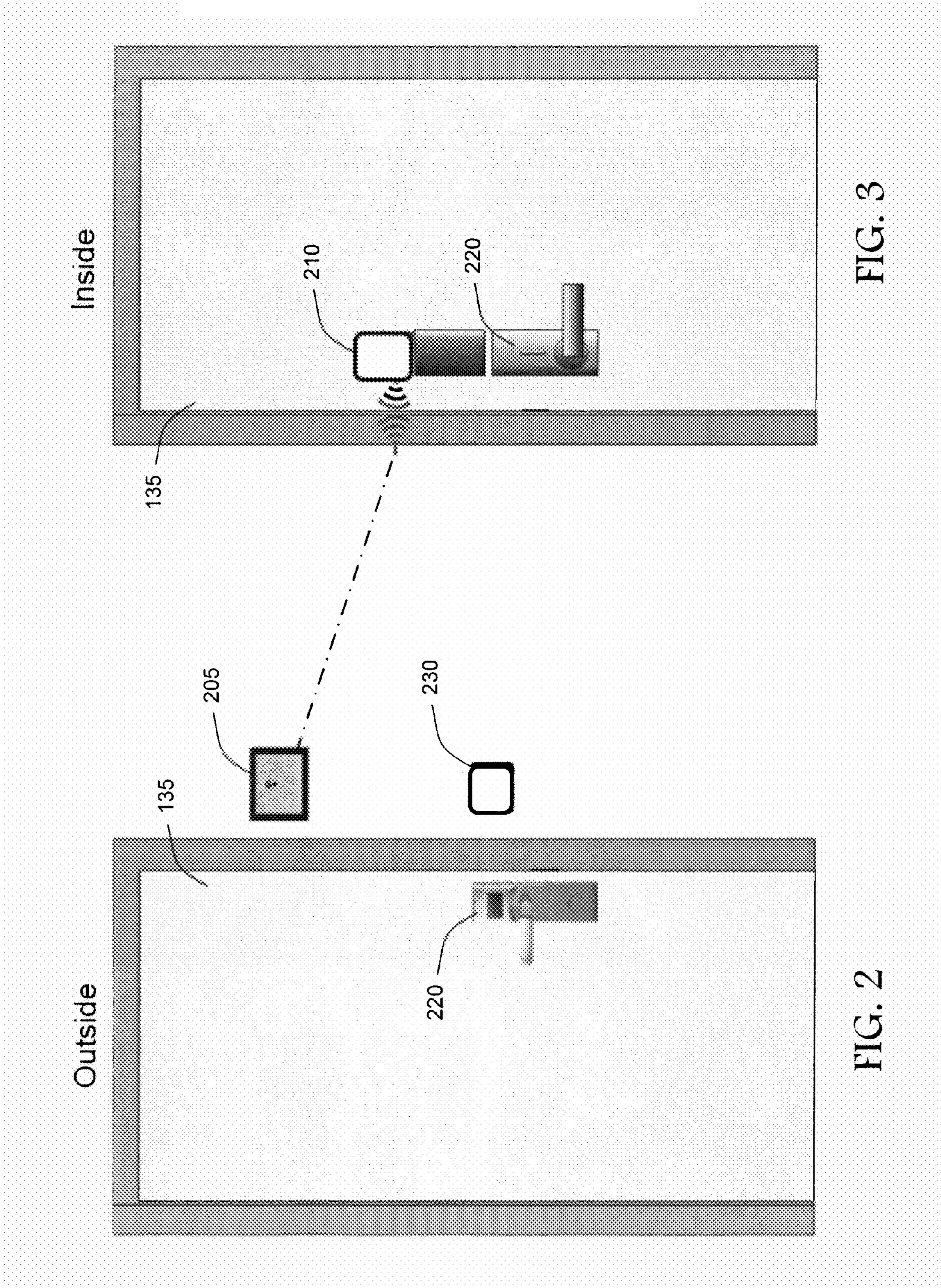
FIGS. 2 and 3 show the outside and the inside, respectively, of a door equipped with an entry control system according to various embodiments of the present invention.
Figure 4:
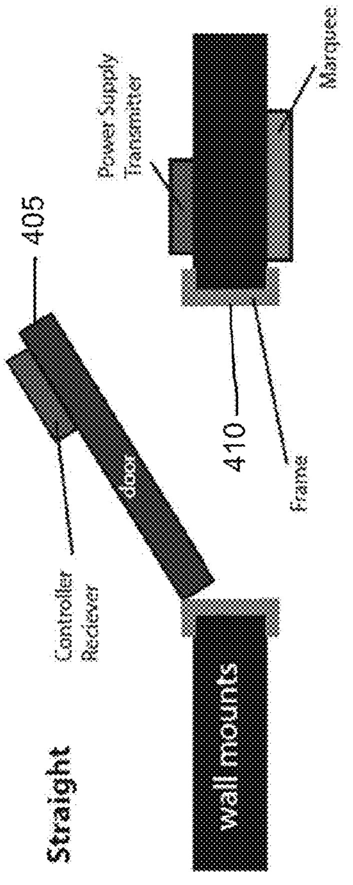
FIGS. 4 and 5 are top views of doors illustrating optional positioning of the entry control system according to two different embodiments of the present invention.
Figure 5:
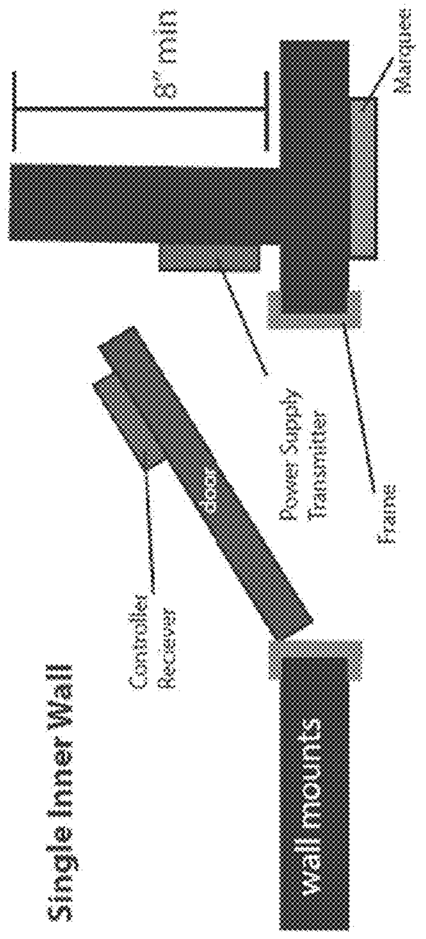

FIGS. 2 and 3 illustrate an exemplary embodiment of the entry control system 140. The entry control system 140 comprises two distinct modules 205, 210 in communication with one another, each implemented as a separate housing enclosing its own electronics. FIGS. 4 and 5 are top views that illustrate two mounting arrangements for the modules 205, 210 of the five illustrated arrangements provided in the provisional application. Although modules 205, 210 are shown as mounted on the surfaces of the walls and doors to extend outward therefrom in FIGS. 4 and 5, it will be appreciated that in some embodiments the walls and/or doors can be modified such that one or both modules 205, 210 are partially or completely recessed and can be flush with the surfaces on which they are disposed.

The outward-facing marquee module 205 is mounted proximate to the door 135, such as in a hallway, and proximate to an electronic door lock 220 of the door 135, as shown in FIG. 2. As used in this context, “proximate” means within a person’s reach when holding the door lock 220. The inward-facing lock controller module 210 is mounted on the inside of the door 135, such as above the door lock 220 as shown in FIG. 3. FIG. 2 shows an optional module 230, such as an NFC pad containing an NFC transceiver, that can be connected to the marquee module 205 and can be used, for instance, to wirelessly connect to a nearby device 105 using an NFC protocol. The marquee module 205 together with and any optional modules 230 comprise a marquee system. In some embodiments, the NFC transceiver can be combined into the marquee module 205.

The door lock 220 can comprise, in various embodiments, a locking mechanism having a latch that is triggered to be released by insertion of card having a magnetic stripe encoding the proper code (a magnetic stripe card lock), a locking mechanism that is released by the presence of an RFID tag or NFC transceiver that encodes the proper code (an RFID/NFC lock), or a locking mechanism that is released by the presence of a Bluetooth LE enabled device that can transmit the proper code (a Bluetooth LE lock).

Figure 6:
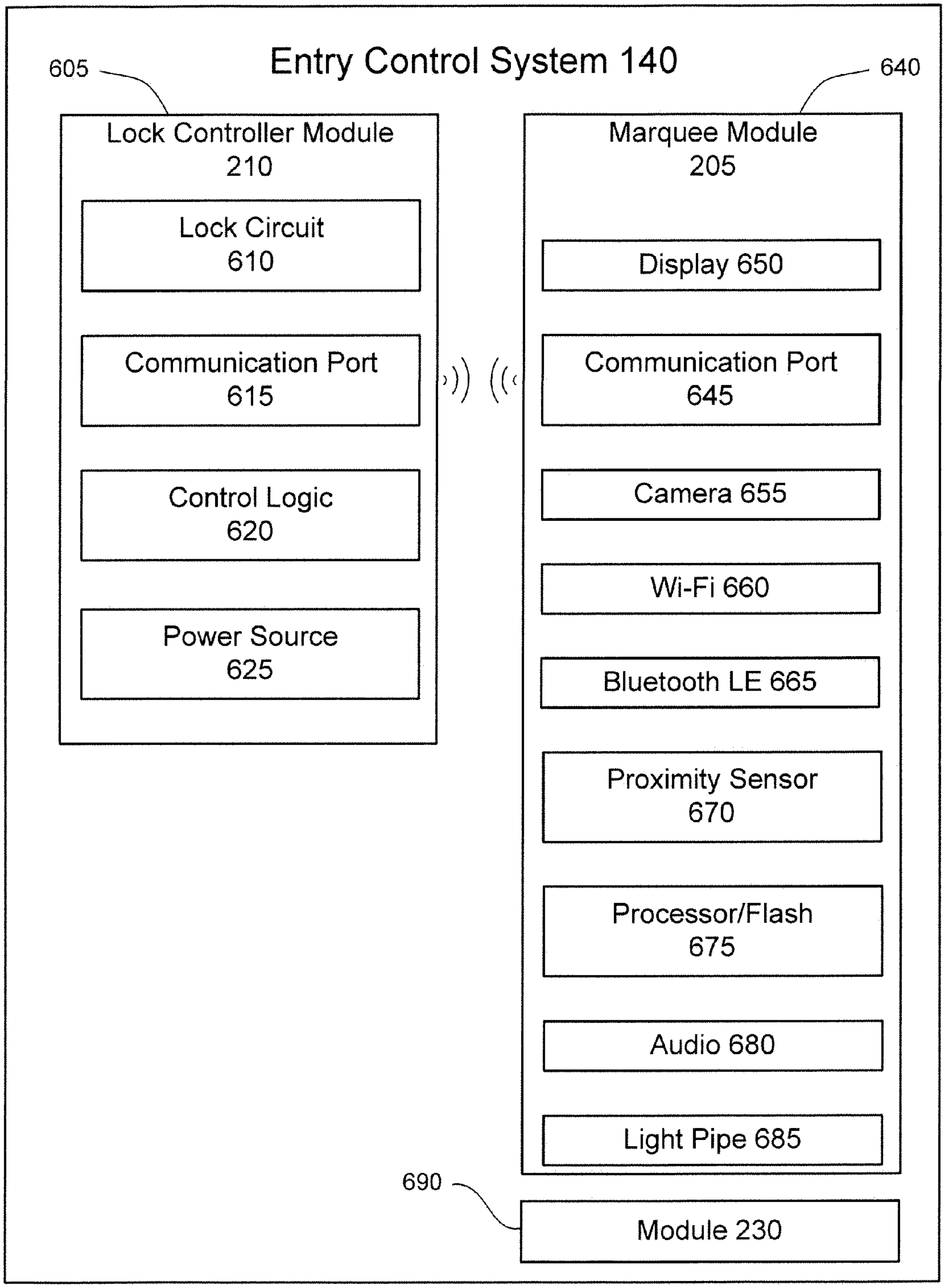
FIG. 6 is a schematic representation of the components of an entry control system according to various embodiments of the present invention.

FIG. 6 is a schematic illustration of the various components of the entry control system 140, according to various embodiments of the present invention. The lock controller module 210 includes a housing 605 that contains electronics including a lock circuit 610, a communication port 615, control logic 620 in communication between the lock circuit 610 and the communication port 615, as well as a power source 625 such as a battery.

The lock circuit 610 is configured to connect to the door lock 220, and in some embodiments the lock circuit 610 includes a wired interface configured to mate with an existing interface within the door lock 220. Many magnetic stripe card locks have such an internal interface. The door lock 220 is typically sealed to prevent tampering with the internal interface, and therefore connecting the wired interface of the lock circuit 610 to the interface within the door lock 220 can require some modification to the door lock 220, in some instances. In other embodiments, the lock circuit 610 includes a wireless interface configured to communicate with a wireless internal interface within the door lock 220. In such embodiments, an internal battery and motor circuit internal to the door lock 220 are able to operate the door unlock motor.

The control logic 620 can comprise firmware, for example, configured to receive a signal from the marquee module 205, via the communication port 615, and to operate the door lock 220 so that the door 135 can open. The control logic 620 and lock circuit 610 can, in some embodiments, also detect the status of the electronic lock deadbolt position and maintain a deadbolt privacy function. The control logic 620 can send a signal on a periodic basis via the communication port 615 to indicate that that the control logic 620 is operational and provide telemetry data, with examples being battery voltage level and door deadbolt position. Control logic 620 is additionally configured to preserve the ordinary operation of the electronic lock via a magnetic stripe card, or RFID, NFC, or Bluetooth LE enabled device, and these operations can also be logged and communicated.

The communication port 615 provides wireless communication to the marquee module 205. In some embodiments, the communication port 615 comprises an infrared transceiver that communicates using an Infrared Data Association (IrDA) protocol. In some of these embodiments the communication port 615 optionally comprises a specially shaped and/or replaceable lens. A lens can serve to protect the optics of the infrared transceiver, a shaped lens can improve communication with another infrared transceiver that is not aligned with the infrared transceiver of the communication port 615, and replaceable lenses address the issue of damage to the lens sufficient to prevent infrared transmission. In various embodiments the door 135 is modified so that the optics of the infrared transceiver are disposed within the panel of the door 135, with the optics or the protective lens flush with, or slightly recessed from, the edge 405 of the door 135 that faces the door frame 410 (see FIG. 4).

The marquee module 205 also includes a housing 640 and electronics including a communication port 645 configured to wirelessly communicate with the communication port 615. In those embodiments in which the communication port 615 comprises an infrared transceiver, the communication port 645 will also comprise an infrared transceiver as just described, and disposed within the door frame 410 to face the infrared transceiver of communication port 615. The communication port 645 having a transceiver within the door frame 410 is illustrated in FIGS. 2 and 3 as a broken line between marquee module 205 and the door frame proximate to the module 210. In additional embodiments, instead of infrared transceivers, the communication ports 615, 645 can comprise Bluetooth or Bluetooth LE.

Marquee module 205 also includes, facing outward from the housing 640, a display 650 such as a touchscreen display to display visual content and receive user input. Marquee module 205 further includes, facing outward from the housing 640, a camera 655 and optionally an LED (not shown) to provide illumination for the camera 655. The camera 655 can be used to image QR codes, for example. Marquee module 205 also includes, within the housing 640, a Wi-Fi module 660 including a Wi-Fi transceiver capable of using the 2.4 GHz and 5 GHz bandwidths using wireless standards 802.11g and 802.11n, and a Bluetooth LE module 665 including a Bluetooth transceiver capable of employing at least Bluetooth LE version 4.n.

Marquee module 205 also includes, within or facing outward from the housing 640, a proximity sensor 670 used to detect an individual within range. The proximity sensor 670 preferably has a known limited range, or has a range that can be adjusted such that the number of false wake-ups will be few. The proximity sensor 670 can comprise an ambient light sensor, in some embodiments.

Marquee module 205 optionally also includes, within or facing outward from the housing 640, one or more of an audio system 680 comprising an audio speaker and/or a microphone, a light pipe 685, an expansion port (not shown), and a power management module (not shown). The audio system 680 optionally uses the Wi-Fi module 660 to connect to a wireless network to provide a two-way audio channel to an in-room device to provide an intercom function, or to a hotel staff electronic device (e.g., phone, walkie-talkie, etc.) to provide immediate guest assistance. The audio system 680 can provide audio effect enhancements for door unlock operations to enhance the experience or to provide assistance to the visually impaired.

The light pipe 685 can be a programmable RGB light pipe disposed around the edge of the marquee module 205 to indicate, via a change of color, the room or electronic lock status. The light pipe 685 can also provide visual effect enhancement of door unlock operations to provide assistance to the hearing-impaired.

The expansion port allows the marquee module 205 to be connected to, and provide power to, optional modules 230. Marquee module 205 optionally also includes a reset switch (not shown), which can be implemented as a magnetic switch (reed switch), and is configured to reboot the marquee module 205.

Marquee module 205 further comprises logic implemented as firmware and memory, illustrated here as a processor 675 with associated memory, such as Flash memory. An exemplary suitable processor 675 is an ARM type microcontroller. The processor 670 is in communication with the communication port 645, display 650, camera 655 and LED, proximity sensor 670, and so forth. The processor 675 can employ an operating system such as embedded Linux running the QT application framework. The memory stores system information such as date and time, room number, device configurations, event logs, etc. The processor 675 and memory serve to implement methods of the invention described below. Updating the firmware can be accomplished, for example, through an over the air (OTA) firmware upgrade process managed by server 115. The power management module and the firmware provide a way to reduce system power in the event of an AC power interruption to preserve selected system functionality while relying on the battery backup system.

The processor 675 of the marquee module 205 communicates with the server 115 via Wi-Fi provided by the Wi-Fi module 660. In various embodiments, the processor 675 of the marquee module 205 sends a signal on a periodic basis to the server 115 to indicate that the marquee module 205 is operational. A suitable period is in the range of 1-10 minutes, for example, and the server 115 is configured to trigger a service alert should a marquee module 205 fail to send the signal after the proper period. The marquee module 205 can also transmit to the server 115 its metadata as well as occurrences of events such as door openings and closings, lockings and unlockings, system reboots, and so forth, some of which may have been received from the control logic 620. The server 115 can also transmit commands to the processor 675 of the marquee module 205. Examples of such commands include updating configuration parameters, screen display design changes, remote system reboot, and remote firmware upgrades. In some embodiments, the system restart can be further communicated to the lock controller module 210 through the communication ports 645 and 615. The processor 675 can also be configured to have the display 650 show the room number, a hotel logo, hotel customized and targeted welcome messages, advertisements, and in-room status notifications such as Do Not Disturb and Please Clean Room.

FIG. 6 also shows that the entry control system 140 can optionally comprise one or more modules 230, each comprising electronics disposed in a distinct and separate housing 690. Modules 230 can be connected to the expansion port of the marquee module 205. In some embodiments, a module 230 is mounted to the wall below the marquee module 205 with the wiring between them disposed within the wall. An NFC pad is an example of a module 230. In some embodiments the marquee module 205 and the module 230 communicate using a communication protocol such as ZigBee.

The marquee module 205 can optionally be powered through a direct AC connection via a Universal Power Supply to convert to DC, or via an external battery. The AC connection can be to a nearby power switch, ceiling light, etc. In various embodiments the marquee module 205 can include a further replaceable internal battery to allow the marquee module 205 to operate on backup power to accommodate power outages. An optional battery sensor to protect the electronics can be implemented to measure parameters like current, voltage, and temperature. An optional battery sensor can also be implemented in the lock controller module 210, in various embodiments. An external battery should be replaceable and able to power the marquee module 205 for at least 7 days, and is optionally rechargeable.

In the embodiments described above, the lock controller module 210 is specified as being mounted to a door 135. However, in other embodiments the lock controller module 210 is disposed within the electronic lock housing. In these embodiments the housing 605 is optional, and in those embodiments that include the housing 605, the housing 605 is configured to fit within the electronic lock housing.

Figure 7:
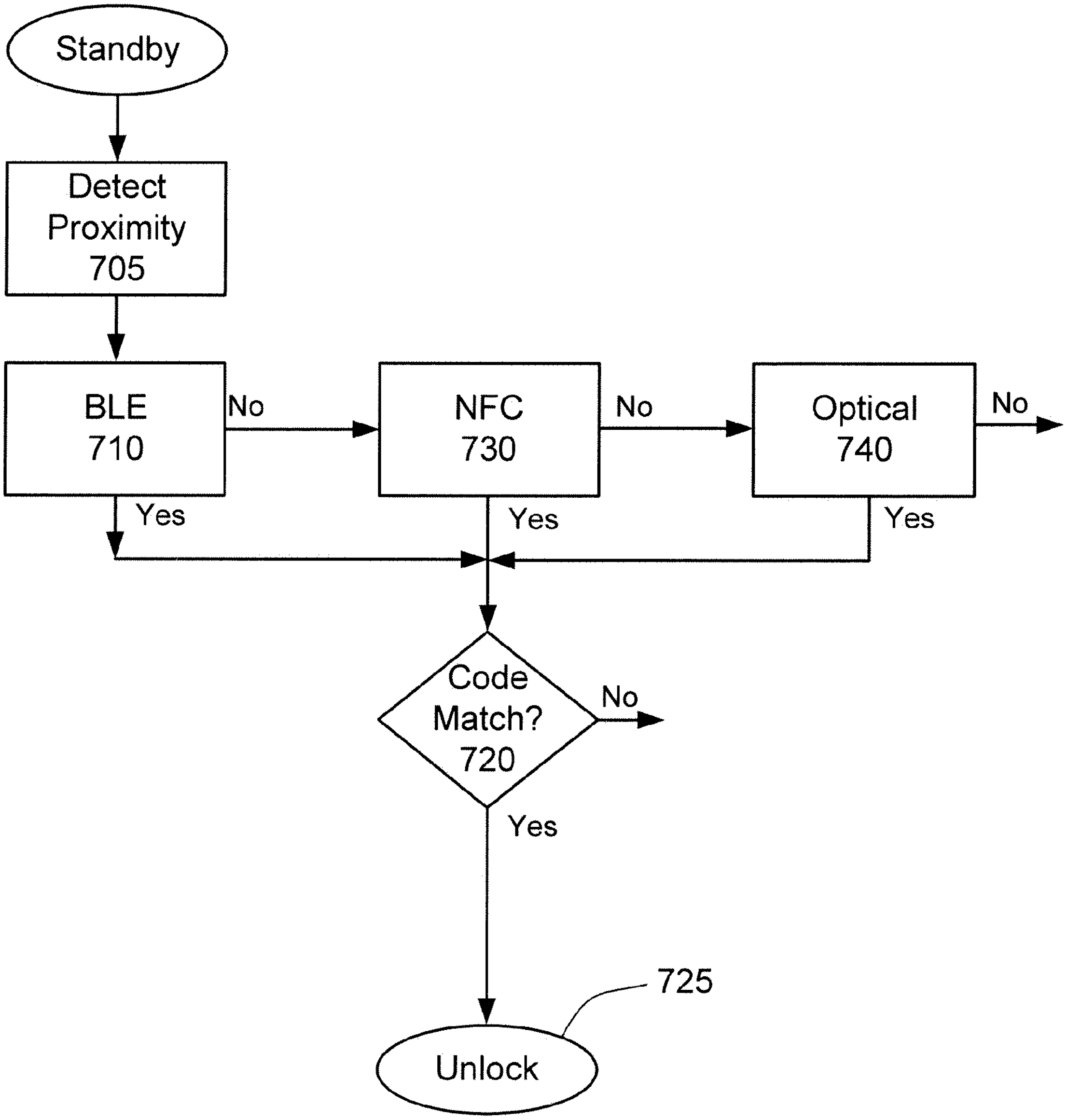
FIG. 7 is a flowchart representation of methods for operating an electronic door lock according to various embodiments of the present invention.

FIG. 7 is a flowchart representation of exemplary methods of the present invention. Initially, the display 650 of the marquee module 205 is either off or displays an idle screen that shows, for example, the room number. In various embodiments, a person having a mobile device 105 checks into a reservation, and prior to the time of check-in the mobile device 105 has been pre-configured to run an application for interfacing with the management system, as discussed below with respect to FIG. 8. Upon check-in, the application on the mobile device 105 is provided with a door code by the management system. The management system also provides the same door code to the entry control system 140 for the door 135 of the reserved room 120, and the entry control system 140 stores the room code.

Accordingly, check-in can be performed via the mobile device 105 before arrival, and at the same time the mobile device 105 and the entry control system 140 can both be configured with the door code so that the person need not personally appear and wait at a front desk, upon arrival, before gaining first entrance to the accommodations. To accommodate those without a mobile device 105, such individuals can still appear at the front desk and receive a magnetic key card to operate the lock in the usual manner, or can be issued a small device with a transceiver appropriate to that of the entry control system 140, such as a Bluetooth LE transceiver or a near field communication transceiver, programmed at the front desk with the proper room code. Alternatively, or additionally, that small device can include a display capable of displaying the room code as a QR code.

In a step 705 the proximity of an individual is detected. This can be achieved by the proximity sensor 670 when a person comes within its range. Proximity can also be detected in other ways, either in the alternative to, or in addition to the use of the proximity sensor 670, such as by a touch of the display 650. When a person is detected, the processor 675 can change the display 650 to provide an entry screen that provides instructions to open the lock 220. For example, the entry screen can instruct the person to enable the application on their mobile device to enter the room.

In a step 710 the processor 675 tries to wirelessly connect to a nearby device 105, or a more limited device supplied at the front desk, via Bluetooth LE using the Bluetooth LE module 665. If the connection can be made, then the room code is passed from the person's device to the Bluetooth LE transceiver 665. Then, in a step 720 the processor 675 determines whether the key from the device matches the stored key, and if so, in a step 725 the processor 675 causes the display 650 to provide a welcome screen, and also transmits an unlock message to the lock controller module 210. Thereafter, in step 725, the control logic 620 of the lock controller module 210 opens the electronic lock by sending a signal through the lock circuit 610 to the door lock 220 to release the latch. Optionally, the welcome screen can indicate messages waiting, as well as make functions available through the touchscreen, such as displaying the waiting messages and turning on room lights.

In a step 730, if no connection can be made in step 710, the processor 675 tries to communicate by NFC. For example, the processor 675 can simultaneously display on the entry screen the instructions to "press the NFC key" icon on the mobile device 105 and the same icon on the display 650, and send a command to the NFC pad 230 to illuminate an LED. If the mobile device 105 communicates a room code to the NFC pad 230 in step 730, then in step 720 the processor 675 determines whether the received room code matches the one stored in the memory. If so, the method proceeds to step 725, as described above.

If no room code is received from the mobile device 105 in a short time in step 730, then in a step 740 the processor 675 enables the camera 655 and optional LED for illumination and simultaneously displays on the entry screen the instructions to "press the QR key" icon on the mobile device 105 to display the room code as a QR code and to present the mobile device 105 to the camera. If the processor 675 can image a QR code in the video received from the camera 655, then in step 720 the processor 675 decodes the QR code and determines whether the received code matches the room code stored in the memory. If so, the method proceeds to step 725, as described above.

In the steps above, if matches are not found, or steps are not completed within a set period of seconds, the method can return to step 705. It will be appreciated that the order of Bluetooth followed by NFC followed by optical is arbitrary and the order of steps is immaterial. Additionally, although the illustrated method proceeds serially from one communication technology to the next, these steps can also be performed in parallel. In some embodiments, during an enrollment process or during a check-in, the application allows the user to select the key presentation method, then, at the time of check-in the preferred method is provided to the entry control system 140, which tries that method first.

Figure 8:
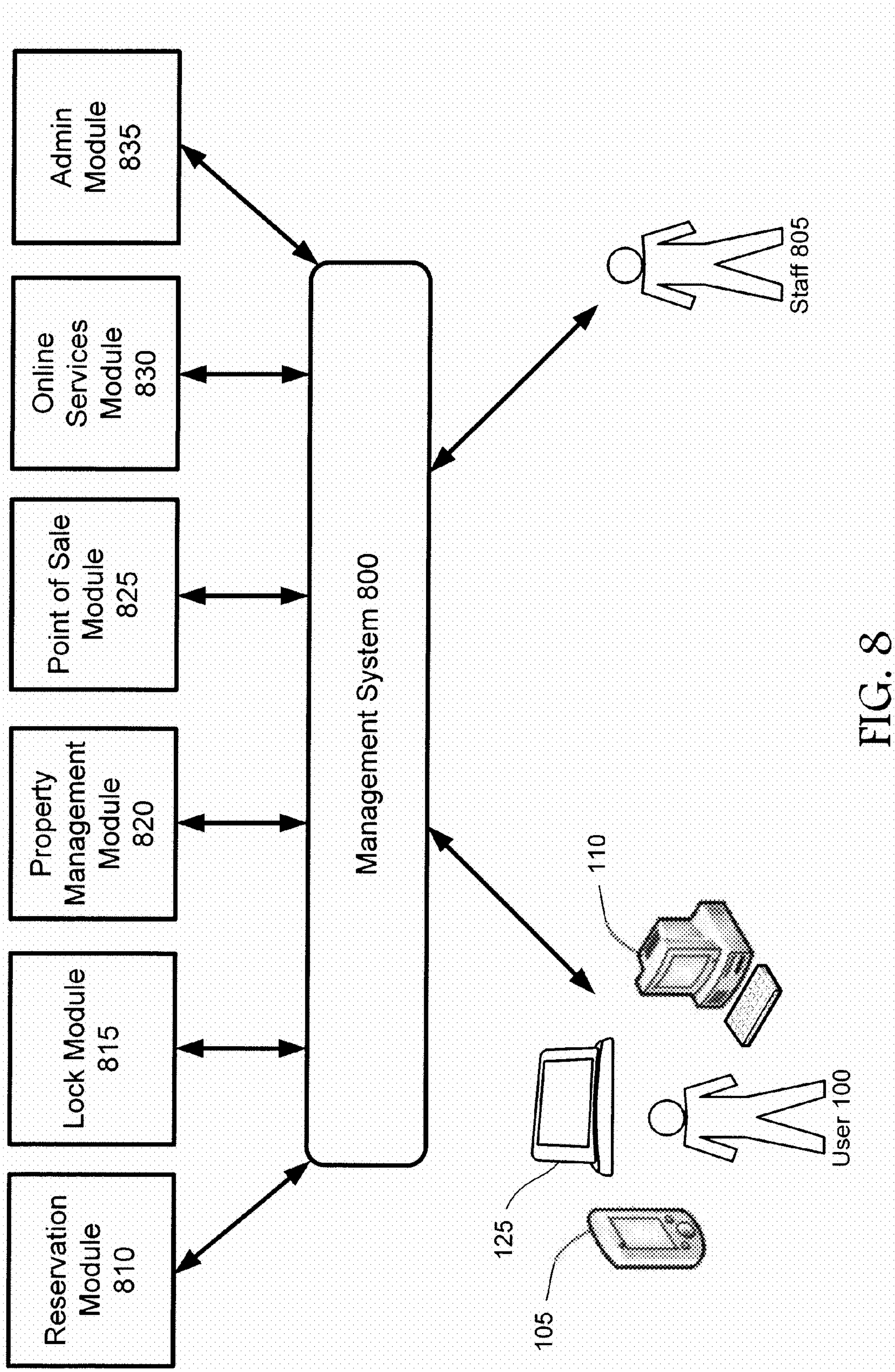
FIG. 8 is a schematic representation of a management system according to various embodiments of the present invention.

Once inside the room 120, the person can employ the tablet 125 to use the same application as on the mobile device 105. Thereafter, with either the tablet 125 or mobile device 105 the person can communicate with the management system. FIG. 8 gives an overview of the management system.

FIG. 8 shows a schematic representation of a management system 800 according to various embodiments of the present invention. The management system 800 can be implemented by one or more servers 115, and provides an interface to users 100 and authorized individuals possessing appropriate credentials, such as hotel management and employees, collectively staff 805 in FIG. 8. Higher levels of authorization can permit some staff 805 to access functions not available to other staff 805. As shown in FIG. 8, management system 800 can be accessed by users 100 by way of mobile devices 105, computers 110, as well as the in-room tablet 125, via a network connection through the Internet, a cellular network, or a Wi-Fi network. Management system 800 can also be accessed by staff 805 using these devices and networks, as well as some additional devices such as walkie-talkies, POTS lines, reservation terminals, and the like.

Accordingly, management system 800 can provide access to various services, represented as modules herein, for example, a reservation module 810, a lock module 815, a property management module 820, a point of sale module 825, an online services module 830, and a GEMS console module 835. Other services and modules will be readily apparent. A user 100 can employ the application on mobile device 105 or computer 110, or a browser of either, to access the management system 800 to select the reservation module 810 and make reservations; and in the same way access the reservation module 810 to check into an existing reservation. In some embodiments, the reservation module 810 is configured to push notifications to the application, to be displayed on the mobile device 105, such as a notification that a reserved room is ready for check-in. In some embodiments, the reservation module 810 allows the user 100 to customize the reservation to add amenities to be present at check-in such as a crib, extra towels, beverages in the refrigerator, and the like. Using the application on a mobile device 105 or tablet 125, for example, these same services can also be accessed after check-in, whether through the reservation module 810 or another module of the management system 800. In various embodiments, the reservation module 810 also coordinates the check-out process, and can offer instant surveys at that time.

The lock module 815 is configured to generate room codes, associate those codes with room reservations, store the associations, and to provide a copy of a room code to both a mobile device 105 and an entry control system 140 for the reserved room, such as upon check-in. Lock module 815 can also perform the functions described above in connection with logging events, providing firmware updates, monitoring normal operations, and so forth.

Property management module 820 is an example of a module that cannot be accessed by users 100 but can be accessed by at least some staff 805 using the devices noted above. The property management module 820 can allow staff 805 to perform tasks such as directing maintenance and room service, scheduling employees, facilities management, monitoring security cameras, calling emergency services, and the like. Point of sale module 825 allows for credit card payments so users 100 can pay for goods and services. Online services module 830 provides users 100 access to online content such as movies and games.

Administrative module 835 provides a real-time, integrated operations management dashboard for the oversight and coordination of guest services, and is another example of a module that cannot be accessed by users 100 but can be accessed by at least some staff 805 using the devices noted above. The administrative module 835 can maintain a service request queue, can provide escalation triggers, and can provide metrics concerning service delivery and utilization and customer satisfaction. The administrative module 835 can also, in some embodiments, push messages to users 100 via mobile device 105 and/or tablet 125 to provide service request status updates, distribute messages and agendas to users 100 within groups, send alerts, and send advertisements. In various embodiments the administrative module 835 can also provide dynamic room assignment.

Computing systems referred to herein, (e.g., personal devices 105, tablets 125, etc.), can comprise an integrated circuit, a microprocessor, and volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above (e.g., control logic 620) can comprise hardware, firmware, or software stored on a computer-readable medium, or combinations thereof. This logic may be implemented in an electronic device to produce a special purpose computing system. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. The use of the term "means" within a claim of this application is intended to invoke 112(*f*) only as to the limitation to which the term attaches and not to the whole claim, while the absence of the term "means" from any claim should be understood as excluding that claim from being interpreted under 112(*f*). As used in the claims of this application, "configured to" is not intended to invoke 112(*f*).

What is claimed is:

1. An entry control system for opening an electronic lock, the system comprising:

a lock controller module including
- a circuit configured to connect to the electronic lock,
- a first wireless communication port, and
- control logic in communication with both the circuit and the wireless communication port and configured to open the electronic lock in response to a signal received from the first wireless communication port;

a marquee system including
- a display, a memory, a second wireless communication port, wireless circuitry configured to provide wireless communications according to at least two different wireless protocols, and
- a processor in communication with each of the display, second wireless communication port, the wireless circuitry, and memory, and configured to
  - receive a first code from the wireless circuitry and store the first code in the memory,
  - receive a second code from the wireless circuitry, and
  - match the first and second codes and then provide a welcome screen to the display and send the signal over the second wireless communication port to the first communication port.

2. The entry control system of claim 1 wherein the marquee system includes
- a first module having a first housing, the display, the second wireless communication port, a first portion of the wireless circuitry for providing a first wireless communication according to a first wireless protocol of the at least two different wireless protocols, the memory, the processor, and an expansion port, and
- a second module having a second housing and a second portion of the wireless circuitry for providing a second wireless communication according to a second wireless protocol of the at least two different wireless protocols, and connected to the expansion port of the first module.

3. The entry control system of claim 2 wherein the first portion of the wireless circuitry includes a Wi-Fi transceiver and the second portion of the wireless circuitry includes a near field communication transceiver.

4. The entry control system of claim 1 wherein the first and second wireless communication ports both comprise infrared transceivers, or both comprise Bluetooth or Bluetooth LE transceivers.

5. The entry control system of claim 1 wherein the memory comprises Flash memory.

6. The entry control system of claim 1 wherein the marquee system further includes a camera and the processor is further configured to receive a video stream from the camera, decode a third code from a QR code presented within the video stream, and match the first and third codes and then provide the welcome screen to the display and send the signal over the second wireless communication port to the first communication port.

7. The entry control system of claim 1 wherein the marquee system further includes a proximity sensor.

8. The entry control system of claim 1 wherein the circuit configured to connect to the electronic lock includes a wired interface configured to mate with an interface disposed within the electronic lock.

9. The entry control system of claim 1 wherein the marquee system further includes an audio system comprising a speaker and a microphone.

10. The entry control system of claim 1 wherein the marquee system further includes a light pipe.

11. The entry control system of claim 1 wherein the electronic lock includes a housing and the lock controller module is disposed within the electronic lock housing.

12. The entry control system of claim 1 wherein the marquee system is configured to provide firmware updates to the control logic of the lock controller module.

13. The entry control system of claim 1 wherein the wireless circuitry includes two or more of a Wi-Fi transceiver, a near field communication transceiver, and Bluetooth LE transceiver.

14. The entry control system of claim 1 wherein the wireless circuitry includes both a Wi-Fi transceiver and a near field communication transceiver, and wherein the processor is configured to receive the first code from the Wi-Fi transceiver and to receive the second code from the near field communication transceiver.

15. A controlled entryway comprising:
- a door frame;
- a door within a door frame and including an electronic lock;
- a lock controller module connected to the electronic lock and including
  - a first wireless communication port, and
  - control logic in communication with both the electronic lock and the wireless communication port and configured to open the electronic lock in response to a signal received from the first wireless communication port;
- a marquee system including
  - a display, a memory, a second wireless communication port, wireless circuitry configured to provide wireless communications according to at least two different wireless protocols, and
  - a processor in communication with each of the display, second wireless communication port, the wireless circuitry, and memory, and configured to receive a first code from the wireless circuitry and store the first code in the memory, receive a second code from the wireless circuitry, and match the first and second codes and then provide a welcome screen to the display and send the signal over the second wireless communication port to the first communication port.

16. The controlled entryway of claim 15 wherein the electronic lock comprises a magnetic stripe card lock.

17. The controlled entryway of claim 15 wherein the first and second wireless communication ports are in optical communication when the door is closed.

18. The controlled entryway of claim 17 wherein the first wireless communication port is disposed within the door and the second wireless communication port is disposed within the door frame.

19. The controlled entryway of claim 15 wherein the lock controller module is mounted on an inside surface of the door and the marquee system is mounted on an outside surface of the door.

20. The controlled entryway of claim 15 wherein the lock controller module further includes a circuit configured to provide the communication between the control logic and the electronic lock.

21. The controlled entryway of claim 15 wherein the door within the door frame opens by sliding or rolling.

22. A method of operating an electronic door lock, the method comprising:

using a first wireless protocol, receiving a door code with a marquee system mounted proximate to the electronic door lock, the marquee system including a housing;

after receiving the door code using the first wireless protocol, wirelessly receiving the door code again with the marquee system using a second wireless protocol;

wirelessly sending a first signal from the marquee system to a lock controller module connected to the electronic lock, the lock controller module including control logic configured to open the electronic lock in response to the first signal received from the marquee system, the lock controller module being mounted proximate to both the electronic door lock and the marquee system;

receiving the first signal at the lock controller module; and sending a second signal from the control logic of the lock control module to the electronic door lock in order to open the electronic door lock.

23. The method of claim 22 wherein the marque system further includes a display and wherein the method further comprises changing the display in response to wirelessly receiving the door code with the second transceiver.

24. The method of claim 22 wherein the first signal comprises an infrared signal.

25. The method of claim 22 further comprising generating the room code with a server and then sending the door code to the marquee system using the first wireless protocol.

26. The method of claim 22 further comprising the control logic of the lock controller module logging a first event consisting of the opening of the electronic door lock and communicating the first event to the marquee system.

27. The method of claim 26 further comprising the control logic of the lock controller module logging a second event consisting of the opening of the electronic door lock with a magnetic key card and communicating the second event to the marquee system.

* * * * *